(12) United States Patent
Link

(10) Patent No.: US 8,782,870 B2
(45) Date of Patent: Jul. 22, 2014

(54) INSULATOR DRILLING JIG

(76) Inventor: David Link, Shakopee, MN (US)

( * ) Notice: Subject to any disclaimer, the term of this patent is extended or adjusted under 35 U.S.C. 154(b) by 391 days.

(21) Appl. No.: 13/272,881

(22) Filed: Oct. 13, 2011

(65) Prior Publication Data
US 2013/0094916 A1    Apr. 18, 2013

(51) Int. Cl.
*B23Q 3/00* (2006.01)
*B23B 47/28* (2006.01)

(52) U.S. Cl.
CPC .......... *B23B 47/281* (2013.01); *B23B 2226/61* (2013.01); *B23B 2226/27* (2013.01); *B23B 2222/00* (2013.01); *B23B 2226/18* (2013.01); *B23B 2222/04* (2013.01)
USPC .......................................... 29/464; 408/72 B

(58) Field of Classification Search
CPC ........ B23P 19/04; B23P 3/186; B23P 19/002; B23Q 3/18; B23B 47/281
USPC ........... 29/464, 514, 505, 428; 408/72 B, 116
See application file for complete search history.

*Primary Examiner* — John C Hong
(74) *Attorney, Agent, or Firm* — Mark A. Litman & Associates, P.A.

(57) ABSTRACT

A jig enabled method of attaching structures such as insulators to support. The jig has: a jig frame comprising a top surface, and two two sides have parallel contact edges at ends of the sides; the top surface has two holes passing through the top surface; within each of the holes is a hollow guide pipe passing from an exterior surface of the top surface through an interior surface of the top surface; and the hollow guide pipe passing past the interior surface of the top surface a distance that is less than a distance to plane formed by the two parallel contact edges. At least one bubble level may be oriented parallel to a surface on the jig and/or parallel to an edge of the jig.

17 Claims, 2 Drawing Sheets

INSULATOR DRILLING JIG

BACKGROUND OF THE INVENTION

1. Field of the Invention

The present invention relates to the field of construction and installation, especially the field of installing electrical insulators, and especially the field of installation and use of electrical insulators in power transmission and above ground power transmission.

2. Background of the Art

In the above-ground transmission of electrical power, whether high voltage or low voltage, it is essential to have the physical transmission lines separated from the above-ground supports. Without that physical separation between the lines and the supports, there are actual and potential problems of power loss, inadvertent power transfer to the support, accidental fire and electrical shortage hazards, and other issues relating to inappropriate transmission of power away from the power lines to the support or objects around or in contact with the support.

The separation between the support and the line is maintained by an insulator on the support and carrying the power line or cable. Where there are multiple lines, the insulators also separate the individual lines from each other.

The insulators are usually put on the supports (e.g., poles, stanchions, walls and the like) during construction. When poles are used, it is possible to place the insulators on the poles before the poles are planted or erected, and the lines are then placed on the insulators after the poles are in place. It is important that the insulators be properly aligned with the supports so that tensions and stress on the support caused by the weight of the lines (and any additional weight and stress added by ice, wind, animals on the lines and the like) are minimized and appropriately aligned. Any stress should be received by the insulator and the support in an optimized vector. Improper alignment of the insulator and its connection to the support can cause excessive stress and wear on the system and reduce its safety and endurance.

The insulators are typically placed on poles by placing a jig against the pole and drilling holes in the pole through alignment holes in the jig. The insulator is then attached to the pole through the holes with screws, bolts and the like. The jig may consist of little more than a flat or curved plate with guide holes therein that is held by hand over the pole, and a drill cuts out holes in the pole after passing through the guide holes. The alignment of the holes and the jig to the surface of the pole can be less than ideal, and alignment can vary significantly between poles and even on the same pole where multiple insulators are present.

SUMMARY OF THE INVENTION

A jig useful for the preparation of a support to receive an insulator has a guide layer having at least one guide hole therein passing from a top surface to a lower surface of the guide layer, support edges projecting away from the lower surface of the guide layer and creating an open volume between the lower surface and two support edges. At least one guide tube on the top surface, the guide tube having a linear channel therein. The linear channel has a predetermined angle with respect to the at least one hole. A system is provided with the jig to temporarily secure the jig to a support surface. One embodiment of the insulator jig comprises at least two guide holes in the guide layer and two guide tubes, each guide tube aligned with each guide hole. Each guide tube has the respective linear channel aligned with the other linear channel so that straight line contact with a top surface of the support through the linear channels intersects the top surface of the support at desired predetermined angles with respect to each other and the surface.

A method is described for attaching an insulator to a top surface of the support. The jig of the present technology is applied to a location on the surface of a support where it is desired that an insulator is to be attached. The support edges are placed into contact with the top surface of the support and the linear channels are aligned with positions on the support where an attachment system for insulators is to be installed on the support. A drilling or hole creation technique, is used through the guide channels to create receptor holes in the support surface. The jig is then removed from the surface. The resulting receptor holes are precisely aligned into the support to provide a designed and optimized attachment position for the insulator. The insulator is then positioned with respect to the receptor holes and an attachment system that engages the receptor holes secures the insulator(s) to the support surface.

DETAILED DESCRIPTION OF THE INVENTION

Figure 1:
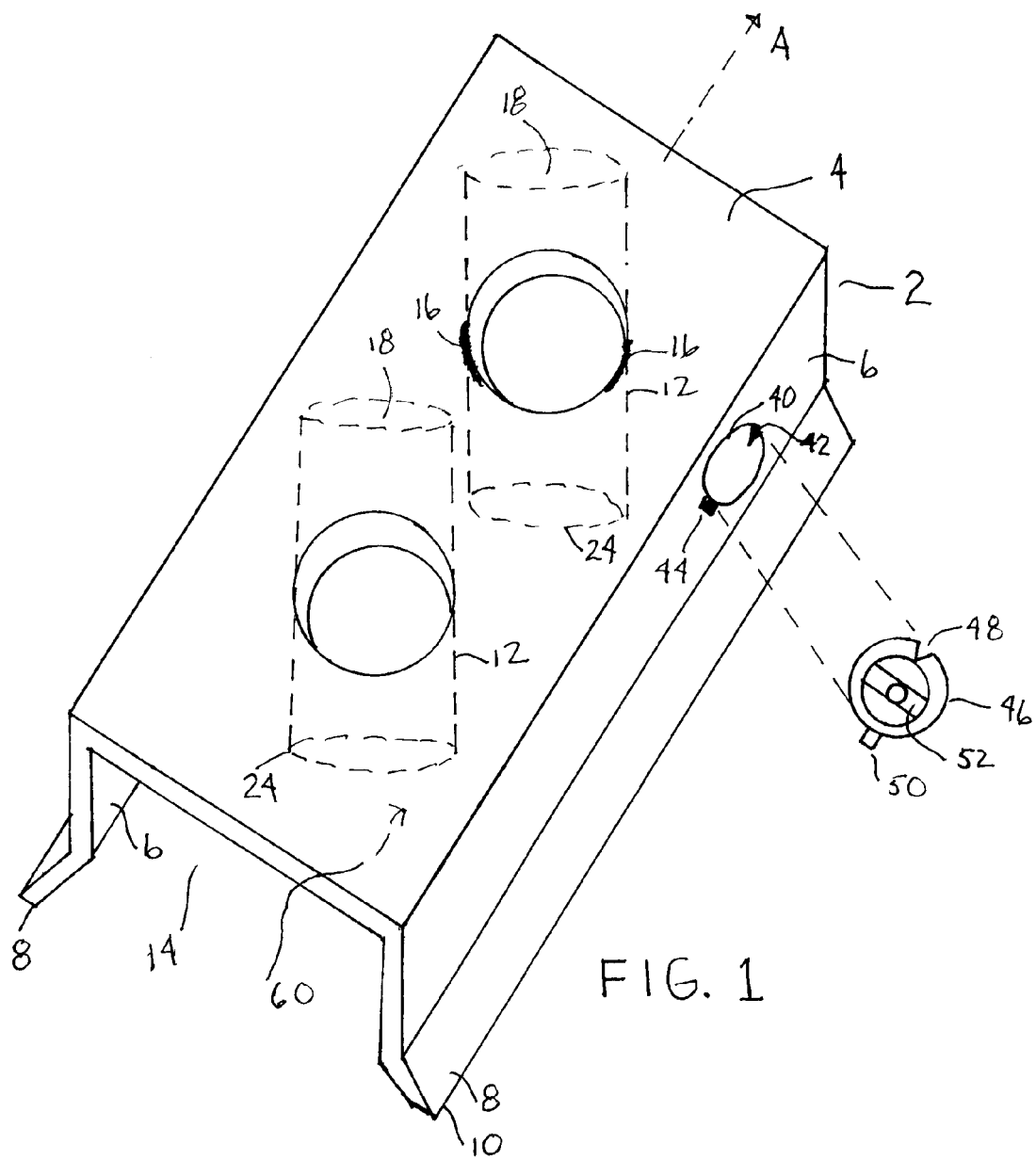
FIG. 1 shows a perspective view of an embodiment of the present technology having two guide tubes.

A jig generically described herein is useful for the preparation of a support to receive an insulator for carrying power lines and the like. The jig has a guide layer or guide base having at least one guide hole therein passing from a top surface to a lower surface of the guide layer. There are support edges (raised edges, lines of posts, rounded bumps or other projections that form a uniform surface that will appropriately conform to a support surface in a predefined, designed manner that aligns the jig with the support surfaces. These projections project away from the lower surface of the guide layer and create an open volume between the lower surface and two support edges. The open volume prevents the lower surface of the jig having to be in continuous conformation with the support. At least one guide tube is provided on the top surface, the guide tube having a linear channel therein. The linear channel has a predetermined angle with respect to the at least one hole. Generally that angle is approximately (±5 degrees or ±10 degrees) perpendicular to the hole. Where an eventual hole in the support is desired at a different angle than perpendicular to the surface of the support, the angle in the linear channel may also be appropriately varied. A system is provided with the jig to temporarily secure the jig to a support surface. Such supports may be clamps, belts, cables, temporary adhesives, pins, spikes and any other mechanical fasteners forming a stable, but removeable attachment. One embodiment of the insulator jig comprises at least two guide holes in the guide layer and two guide tubes, each guide tube aligned with each guide hole. Each guide tube has the respective linear channel aligned with the other linear channel so that straight line contact with a top surface of the support through the linear channels intersects the top surface of the support at desired predetermined angles with respect to each other and the surface.

A method is described for attaching an insulator to a top surface of the support. The jig of the present technology is applied to a location on the surface of a support where it is desired that an insulator is to be attached. The jig is temporarily secured to the support by the temporary attachment elements. The support edges are placed into contact with the top surface of the support and the linear channels are aligned with positions on the support where an attachment system for insulators is to be installed on the support. A drilling or hole creation technique is used through the guide channels to create receptor holes in the support surface. The jig is then removed from the surface. The resulting receptor holes are precisely aligned into the support to provide a designed and optimized attachment position for the insulator. The insulator is then positioned with respect to the receptor holes and an attachment system that engages the receptor holes secures the insulator(s) to the support surface.

The present technology may be described as a jig and method of using that jig as follows. A jig for use in assisting the orientation and fixing of an insulator to a support may have: a jig frame comprising a top surface, and two sides that define an open volume; the two sides have parallel contact edges at ends of the sides; the top surface has two holes passing through the top surface; within each of the holes is a hollow guide pipe passing from an exterior surface of the top surface through an interior surface of the top surface; and the hollow guide pipe passing past the interior surface of the top surface a distance that is less than a distance to plane formed by the two parallel contact edges. The jig may have a securing element for temporarily securing the jig to a surface to be machined. The securing element may be an attachment element on the jig between the two guide pipes. The securing element may further have a strap with a temporary locking element on the strap. The two guide pipes may each be perpendicular to the top surface, and therefore parallel to each other. The jig may have at least one level indicator. The level indicator may be a typical bubble level indicator, semiconductor level indicator, electronic level indicator, spring balance level indicator and the like. The level indicator should be oriented specifically perpendicular or specifically parallel to a surface on the jig and/or perpendicular or parallel to an edge of the jig. The jig may have the two sides of the jig as a flat extension portion and a contact portion angled outwardly and away from the flat extension portion to be machined and the hole having a level indicator therein that indicates when the top is horizontally level.

The jig should have an opening on at least one of the sides that has an axis through the center of the opening parallel to the top surface of the jig and perpendicular to the side through which it is drilled. The opening may have a notch on its circumference or an inwardly facing post on its circumference. The level indicator respectively may have an extension fitting into the notch or a gap in the circumference of the level indicator that receives the post to align the level indicator perpendicular or parallel to the top surface. The two guide pipes should each perpendicular to the top surface. The two guide pipes are each perpendicular to the top surface and the level indicator comprises a bubble level indicator and the level indicator is removable from the hole and is positionable within the hole only when a post and gap or a notch and extension are aligned.

The jig may be used in a method of attaching an insulator to a support by: placing the jig against a surface to which the insulator is to be attached, orienting the two contact portions with a top surface of the support, aligning the guide tubes with specific positions on the support where connectors for an insulator are to be used to form an aligned position, temporarily securing the jig in the aligned position, passing a drill bit connected to a drill through the guide tubes to contact the support, drilling holes in the support at the specific positions, withdrawing the drill bits from the guide wires, removing the jig from the support, aligning holes in an insulator with the drilled holes in the support, and connecting the insulator to the support with connectors that attached through the drilled holes. Where the bubble level is present, the method may be practiced by: placing the jig of claim 8 against a surface to which the insulator is to be attached, orienting the two contact portions with a top surface of the support, leveling the jig against the support using visual observation of the bubble level, aligning the guide tubes with specific positions on the support where connectors for an insulator are to be used to form an aligned position, temporarily securing the jig in the aligned position, passing a drill bit connected to a drill through the guide tubes to contact the support, drilling holes in the support at the specific positions, withdrawing the drill bits from the guide wires, removing the jig from the support, aligning holes in an insulator with the drilled holes in the support, and connecting the insulator to the support with connectors that attached through the drilled holes.

There may be as few as two or three basic elements or parts to the Insulator Drilling jig. There is a base, drilling pipes (guide tubes) and a connecting element to the support (e.g., straps to hold the drilling jig to a pole or support). The base and drilling pipes may be made of some material that can exhibit some incidental resistance to contact with a drill, which will occur during use. Metals, ceramics, polymers, composites and even wood may be used. The selection is based upon the endurance desired for the guide tubes, which will be the component that comes into the most frequent contact with the drill during use. Preferred materials are composites and metals, with aluminum being desirable because of its light weight. Aluminum also does less damage to the drill bits.

The base may be made from an actual part of an insulator, so that the shape, curvature, and configuration of the jig will therefore exactly replicate the insulator used on that site. The insulator can be used to for the base of the jig, the part of the jig that makes contact with the support, such as a wood pole. The base sits firmly on the pole exactly as the insulator will. The advantage of this is the drilling jig will provide a true perpendicular position for when the insulator gets mounted on the pole. It is important to get the insulator perpendicular to the conductor. If the insulator is not perpendicular to the conductor it can be difficult to attach the conductor to the insulator. This attachment point, if crooked, also causes stress on the insulator and the wire or power line attached thereto. This stress can and has caused failure on the insulator. Individual poles are not perfectly round. If a pole is oval shaped the insulator jig will provide the correct spot to drill so the insulator will be perpendicular the conductor.

The base of the jig may have an in-line bubble level on one or both sides. The level will tell you to adjust the jig so that desired portions are parallel to the ground. This assists the user in drilling the pole for a perpendicular position when the insulator gets mounted. The jig base can be made of any length to accommodate different bolt spacing's for different insulator dimensions. An example of this would be a 14 inch base for a 12 inch insulator hole pattern.

The drilling pipes can be made of different inside dimensions depending on the size drill to be used. An example of this would be if a $^{15}/_{16}$" drill bit were to be used, a 1" or a $1^{1}/_{16}$" ID (inside diameter) pipe should be used. The drilling pipes need to be of sufficient length to keep the drill bit straight with the drilling pipe. The pipe should not extent too far into the base. There needs to be an inch or so (2 cm to 5 cm) of space between the pole and the bottom of the drilling jig so the wood chips can fall before they enter the drilling pipes. A preferred system for connecting the jig to a pole is a strap that can be tied or snapped or firmly adjusted in a temporary restraining position about the pole. Simple strap locking elements or clips may be used to accomplish this. The straps may either be completely separate from the jig or be attached through strap guides on the jig. The strap should be an adjustable ratchet strap. The strap wraps around the pole and each end of the strap attaches to the drilling jig. When the drilling jig is level you tighten the strap and drill the holes.

Reference to the Figure can assist in a more thorough understanding of the present technology.

FIG. 1 shows a perspective view of a jig 2 used for the preparation of a work surface (not shown) for attachment of an insulator. The jig 2 has a top surface 4 (which may be relatively flat), supporting sides 6 and a positioning element 8. The combination of 4, 6 and 8 forms the jig base. The positioning element 8 has a contact edge 10 that is used to position the jig 2 against the support surface (e.g., a pole) on which the insulator is to be attached. At least one and preferably two guide pipes or guide poles 12 (in dash lines) are positioned through the top surface 4. Each guide pipe 12 has a cannula or opening 18 that passes through the length of each guide pipe 12. Ends 24 of the guide pipes 12 extend only so far as to enable the contact edges 10 of the positioning element 8 to be placed against a support without the ends 24 touching the surface. Preferably the ends 24 are spaced significantly above the contact edges 10 within the jig 2 so that material cut from the support will not always be drawn back into the guide pipes 12. A space of 2 to 8 cm will usually be sufficient space. The opening 40 is shown with a post 42 and a notch 44 and the removable level (shown as a bubble level 52) 46 indicating the horizontal position of the top surface 4. The removable level 46 is shown with both a groove 48 that is shaped to engage the shape of post 42 and an extending element 50 that is shaped to engage the shape of notch 44. These types of conforming shapes in elements are referred to (collectively including the shape of the opening 40 and the shape of the mating configuration in the shape of the removable level 46) as an orienting engagement system. As shown in FIG. 1, when the level 46 is inserted into the opening 40, there is only a single orientation in which the level 46 may be inserted. A single orienting engagement system (e.g., only 42 and 48 or only 44 and 50) will suffice for proper orientation, and the dual system in FIG. 1, although useful, is only illustrative. The opening 40 need not be a complete through-hole on the side 6, but may be a shaped enclosure for the level 46. A benefit to a through hole, or at least an opening with a portion of the opening opened to the space 60 between the two sides 6 is that the level 46, when inserted into the opening 40 may be easily removed by pressure against the back of the level 46 through a partial through-hole (e.g., the diameter of an opening in the interior side of the walls 6 is smaller than the outer diameter of the opening 40 on an exterior face of the side 6. The bubble level (or other level indicator) is shown indicating perpendicularity of the top surface 4 with the support or the horizon with respect to line A. An additional or alternative level bubble (or level indicator) may be present for indicating level positioning in a direction perpendicular to line A.

The jig is also shown with the optional space 14 which is typically part of a an insulator base, just as holes in the top plate 4 where the guide pipes 12 pass through the top surface 4 are typically part of the insulator base to enable attachment of the insulator base to a support. A soldered joint 16 shows where a guide pipe 12 has been soldered into the top surface 4 of the jig 2 where attachment holes are normally present in the insulator base.

Figure 2:
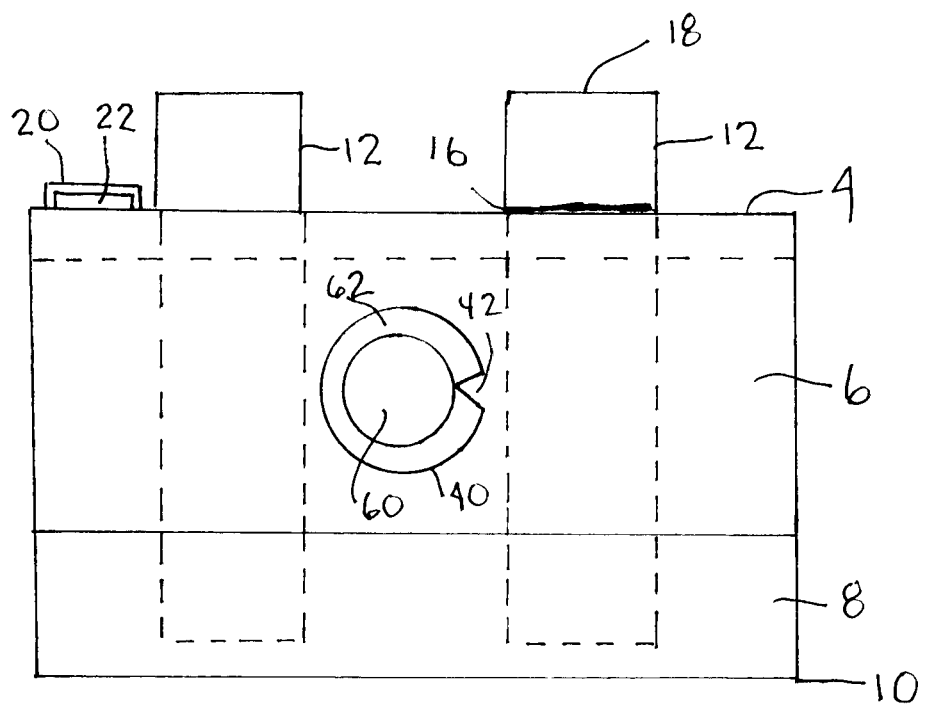
FIG. 2 shows a cutaway side view of the insulator jig with a strap guide.

Also shown in FIG. 2 shows a cutaway side view of the insulator jig 2 with a strap guide 20 with a slot 22 through which a strap (not shown) may be passed so that the strap may surround both the jig 2 and the support (e.g., pole) while holes are drilled in the support, without the attachment means interfering with the line of sight of the drilling through the guide poles 12. Instead of the strap connectors, snake coils, snaps, rigid circular connectors and other attachment means could be associated with the jig at the position of the strap connector. The guide pipes are shown in their orientation perpendicular to the top surface 4.

A bubble level 62 is shown on the positioning element, but it may alternatively be positioned on the top surface 4 or Positioning sides 6.

Although specific and enabling disclosure has been provided in the description of the present invention, one of ordinary skill in the art can used alternative or equivalent materials, dimensions and components in practicing the generic scope of invention described herein and embodied in the claims.

The invention claimed is:

1. A jig for use in assisting orientation and fixing of an insulator to a support comprising: a jig frame comprising a top surface, and two sides that define an open volume; the two sides have parallel contact edges at ends of the sides; at least one of the two sides having an opening therein of at least 1.5 cm in diameter; the top surface has two holes passing through the top surface; within each of the holes is a hollow guide pipe passing from an exterior surface of the top surface through an interior surface of the top surface; the hollow guide pipe passing past the interior surface of the top surface a distance that is less than a distance to plane formed by the two parallel contact edges.

2. The jig of claim 1 having a securing element for temporarily securing the jig to a surface to be machined and the opening having a level indicator therein that indicates when the top surface is horizontally level.

3. The jig of claim 2 wherein the securing element comprises an attachment element on the jig between the two guide pipes.

4. The jig of claim 2 wherein the opening has a notch on its circumference or an inwardly facing post and the level indicator respectively has an extension fitting into the notch or a gap in the circumference of the level indicator that receives the post to align the level indicator perpendicular to the top surface.

5. The jig of claim 4 wherein the two guide pipes are each perpendicular to the top surface and the level indicator comprises a bubble level indicator and the level indicator is removable from the opening and is positionable within the opening only when a post and gap or a notch and extension are aligned.

6. A method of attaching an insulator to a support comprising:
    placing the jig of claim 5 against a surface to which the insulator is to be attached, orienting two contact portions with a top surface of the support, aligning guide tubes with specific positions on the support where connectors for an insulator are to be used to form an aligned position, adjusting the insulator so that the top surface is parallel to the a nearest surface of the support according to the level indicator; temporarily securing the jig in the aligned position, passing a drill bit connected to a drill through the guide tubes to contact the support, drilling holes in the support at the specific positions, withdrawing the drill bits from the guide tubes, removing the jig from the support, aligning holes in an insulator with the drilled holes in the support, and connecting the insulator to the support with connectors that attached through the drilled holes.

7. The jig of claim 4 having at least one bubble in the opening oriented perpendicularly to the top surface on the jig.

8. A method of attaching an insulator to a support comprising:
placing the jig of claim 7 against a surface to which the insulator is to be attached, orienting two contact portions with a top surface of the support, aligning guide tubes with specific positions on the support where connectors for an insulator are to be used to form an aligned position, adjusting the insulator so that the top surface is parallel to the a nearest surface of the support according to the level indicator; temporarily securing the jig in the aligned position, passing a drill bit connected to a drill through the guide tubes to contact the support, drilling holes in the support at the specific positions, withdrawing the drill bits from the guide tubes, removing the jig from the support, aligning holes in an insulator with the drilled holes in the support, and connecting the insulator to the support with connectors that attached through the drilled holes.

9. A method of attaching an insulator to a support comprising:
placing the jig of claim 4 against a surface to which the insulator is to be attached, orienting two contact portions with a top surface of the support, aligning guide tubes with specific positions on the support where connectors for an insulator are to be used to form an aligned position, adjusting the insulator so that the top surface is parallel to the a nearest surface of the support according to the level indicator; temporarily securing the jig in the aligned position, passing a drill bit connected to a drill through the guide tubes to contact the support, drilling holes in the support at the specific positions, withdrawing the drill bits from the guide tubes, removing the jig from the support, aligning holes in an insulator with the drilled holes in the support, and connecting the insulator to the support with connectors that attached through the drilled holes.

10. The jig of claim 2 wherein the two guide pipes are each perpendicular to the top surface.

11. The jig of claim 10 wherein the two sides of the jig comprise a flat extension portion and a contact portion angled outwardly and away from the flat extension portion.

12. A method of attaching an insulator to a support comprising:
placing the jig of claim 2 against a surface to which the insulator is to be attached, orienting two contact portions with a top surface of the support, aligning guide tubes with specific positions on the support where connectors for an insulator are to be used to form an aligned position, adjusting the insulator so that the top surface is parallel to the a nearest surface of the support according to the level indicator; temporarily securing the jig in the aligned position, passing a drill bit connected to a drill through the guide tubes to contact the support, drilling holes in the support at the specific positions, withdrawing the drill bits from the guide tubes, removing the jig from the support, aligning holes in an insulator with the drilled holes in the support, and connecting the insulator to the support with connectors that attached through the drilled holes.

13. The jig of claim 1 wherein the two guide pipes are each perpendicular to the top surface.

14. The jig of claim 13 wherein the two sides of the jig comprise a flat extension portion and a contact portion angled outwardly and away from the flat extension portion.

15. The jig of claim 1 having at least one bubble level in the opening oriented perpendicularly to the top surface on the jig.

16. The jig of claim 15 wherein the two sides of the jig comprise a flat extension portion and a contact portion angled outwardly and away from a flat extension portion.

17. A method of attaching an insulator to a support comprising:
placing the jig of claim 1 against a surface to which the insulator is to be attached, orienting two contact portions with a top surface of the support, aligning guide tubes with specific positions on the support where connectors for an insulator are to be used to form an aligned position, temporarily securing the jig in the aligned position, passing a drill bit connected to a drill through the guide tubes to contact the support, drilling holes in the support at the specific positions, withdrawing the drill bits from the guide tubes, removing the jig from the support, aligning holes in an insulator with the drilled holes in the support, and connecting the insulator to the support with connectors that attached through the drilled holes.

* * * * *